(12) United States Patent
Drobkov et al.

(10) Patent No.: US 9,134,158 B2
(45) Date of Patent: Sep. 15, 2015

(54) DEVICE AND METHOD FOR DETERMINING A FLOW VELOCITY OF A FLUID OR A FLUID COMPONENT IN A PIPELINE

(75) Inventors: Vladamir Drobkov, Moscow (RU); Vladamir Melnikov, North Novgorod (RU); Andrey Shustov, Nijmegen (NL)

(73) Assignee: NEST INTERNATIONAL N.V., Willemstad (CW)

( * ) Notice: Subject to any disclaimer, the term of this patent is extended or adjusted under 35 U.S.C. 154(b) by 195 days.

(21) Appl. No.: 13/994,749

(22) PCT Filed: Dec. 20, 2011

(86) PCT No.: PCT/NL2011/050864
§ 371 (c)(1),
(2), (4) Date: Sep. 19, 2013

(87) PCT Pub. No.: WO2012/087120
PCT Pub. Date: Jun. 28, 2012

(65) Prior Publication Data
US 2014/0290382 A1    Oct. 2, 2014

Related U.S. Application Data

(60) Provisional application No. 61/425,704, filed on Dec. 21, 2010.

(30) Foreign Application Priority Data

Dec. 21, 2010   (NL) ..................................... 2005886

(51) Int. Cl.
*G01F 1/66*       (2006.01)
*G01F 1/74*       (2006.01)

(52) U.S. Cl.
CPC ............... *G01F 1/663* (2013.01); *G01F 1/662* (2013.01); *G01F 1/74* (2013.01)

(58) Field of Classification Search
CPC ............. G01F 1/66; G01F 1/708; G01F 1/60; G01V 1/40
USPC ............... 73/861.19, 861.31, 861.25, 861.28, 73/861.95, 861.29
See application file for complete search history.

(56) References Cited

U.S. PATENT DOCUMENTS 3,165,928 A * 1/1965 Poulos ........................ 73/861.29
3,741,014 A * 6/1973 Tamura ...................... 73/861.25
(Continued)

FOREIGN PATENT DOCUMENTS

EP          2103911 A1    9/2009
FR          1232113 A     10/1960
WO      2007129897 A1    11/2004

OTHER PUBLICATIONS

Search and Examination Report in related Singapore Application No. 201304824-4, mailed Apr. 15, 2014.
(Continued)

*Primary Examiner* — Jewel V Thompson
(74) *Attorney, Agent, or Firm* — Troutman Sanders LLP; Ryan A. Scheider; Benjamin C. Wiles (57) ABSTRACT

A device and a method for determining a flow velocity of a fluid or a fluid component in a pipeline is described. The device comprises a transmitter adapted to be placed inside the pipeline and arranged to transmit an ultrasound signal into the fluid or fluid component in a first direction; a receiver adapted to be placed inside the pipeline and arranged to receive a dispersed ultrasound signal, generated by dispersion of the ultrasound signal by the fluid or the fluid component in a second direction, the second direction being different from the first direction, and to provide a receiver signal representing the dispersed ultrasound signal; and, a processing unit arranged to receive said receiver signal and to determine a frequency difference between the transmitted ultrasound signal and the dispersed ultrasound signal and determining the flow velocity of the fluid or the fluid component based on said difference.

40 Claims, 3 Drawing Sheets (56) References Cited

U.S. PATENT DOCUMENTS

| | | | | |
|---|---|---|---|---|
| 3,974,500 | A * | 8/1976 | Goldfischer | 342/113 |
| 4,066,095 | A | 1/1978 | Massa | |
| 4,181,432 | A * | 1/1980 | Flower | 356/28 |
| 4,237,730 | A * | 12/1980 | Feng | 73/861.95 |
| 4,718,269 | A * | 1/1988 | Der Kinderen | 73/19.03 |
| 5,526,696 | A * | 6/1996 | Cappi | 73/861.95 |
| 6,209,388 | B1 * | 4/2001 | Letton et al. | 73/61.79 |
| 7,267,798 | B2 * | 9/2007 | Chandler | 422/82.05 |
| 2002/0143480 | A1 | 10/2002 | Komatsu et al. | |
| 2004/0199340 | A1 | 10/2004 | Kersey et al. | |
| 2006/0048583 | A1 | 3/2006 | Gysling | |
| 2008/0163700 | A1 | 7/2008 | Huang | |
| 2008/0307895 | A1 | 12/2008 | Zhang et al. | |
| 2009/0044636 | A1 * | 2/2009 | Hope | 73/861.28 |
| 2014/0144247 | A1 * | 5/2014 | Wiest et al. | 73/861.31 |

OTHER PUBLICATIONS

Search Report for the NL prior application NL 2005886, dated Jun. 24, 2011.
Search Report for the PCT prior application PCT/NL2011/050864, dated Apr. 13, 2012.

* cited by examiner

DEVICE AND METHOD FOR DETERMINING A FLOW VELOCITY OF A FLUID OR A FLUID COMPONENT IN A PIPELINE

CROSS-REFERENCE TO RELATED APPLICATIONS

This application is a US National Stage of International Application No. PCT/NL2011/050864, filed 20 Dec. 2011, which claims the benefit of NL 2005886, filed 21 Dec. 2010, and U.S. Provisional Patent Application No. 61/425,704, filed 21 Dec. 2010, both herein fully incorporated by reference.

FIELD OF TECHNOLOGY

The present invention relates to a device and a method for determining a flow velocity of a fluid or a fluid component in a pipeline. As an example, it may be applied in flows of crude oil and gas production and transportation systems, in chemical and petrochemical production, as well as in fuel and energy industries, etc.

BACKGROUND ART

A method for measuring a flow velocity of a fluid in a pipeline known in the art is described below. The method implies probing a controlled volume of a fluid with ultrasonic pulses emitted by a first source (emitter) and travelling transversely to the pipeline axis. The pulses that have passed through a controlled volume are registered by a first pulse receiver located oppositely to the emitter. A second pair of an emitter and a pulse receiver is located downstream at a known distance from the first pair. Using a cross correlation method applied to the signals of the two pulse receivers, the time interval in which the fluid flows from the first pair to the second pair can be determined. From this, the flow velocity is determined.

A disadvantage of this method is that measuring the flow velocity using the cross correlation method is not possible in an unsteady flow, as in this case the cross correlation method is often inaccurate. This yields an inaccurate determination of the flow velocity.

SUMMARY OF THE INVENTION

An objective of the invention is to provide a device and method for determining a flow velocity of a fluid or a fluid component in a pipeline with a higher accuracy of determining the flow velocity than the method described above.

This objective is achieved by a device for determining a flow velocity of a fluid or a fluid component in a pipeline, comprising a transmitter adapted to be placed inside the pipeline and arranged to transmit an ultrasound signal into the fluid or fluid component in a first direction; a receiver adapted to be placed inside the pipeline and arranged to receive a dispersed ultrasound signal, generated by dispersion of the ultrasound signal by the fluid or the fluid component in a second direction, the second direction being different from the first direction, and to provide a receiver signal representing the dispersed ultrasound signal; a processing unit arranged to receive said receiver signal and to determine a frequency difference between the transmitted ultrasound signal and the dispersed ultrasound signal and determining the flow velocity of the fluid or the fluid component based on said difference.

According to the invention, the device comprises a transmitter for transmitting an ultrasound signal to a flowing fluid. The transmitter may be a piezo-electric transmitter or any other ultrasound transmitter. In accordance with the present invention, a fluid may be a liquid or a gas. The fluid may comprise multiple fluid components, being liquid and/or gas components. In particular, the present invention enables determining the flow velocity of a liquid component in a fluid comprising a liquid and a gas. Ultrasound is sound with a frequency greater than the upper limit of human hearing, approximately 20 kHz. When an ultrasound signal is transmitted to a flowing fluid, the fluid will disperse the signal. This signal is subsequently received by a receiver, e.g. a piezo-electric receiver. The frequency of the dispersed signal as received by the receiver will depend on frequency of the transmitted ultrasound signal and the velocity difference between (i) the transmitter and the fluid and (ii) the fluid and the receiver, according to the well-known Doppler principle.

The transmitter and the receiver are adapted to be placed inside the pipeline. The transmitter and the receiver may be placed on a ring or other supporting construction that is to be placed inside the pipeline. The transmitter and the receiver may each comprise an connecting plate, which may be connected to the inside wall of the pipeline.

In an embodiment, the transmitter and receiver define a measurement volume having a comparatively small cross-section compared to the pipeline cross-section. Such measurement volume can e.g. be realized by arranging both the transmitter and receiver close to each other near a central position inside the pipeline. Note that such an arrangement is distinct from an arrangement whereby the transmitter and receiver are directly arranged on a surface of the pipeline, e.g. an inner or outer surface of the pipeline.

In an embodiment, the distance between the transmitter and the receiver, in a direction perpendicular to the flow direction is about 5 to 10% of the pipeline diameter. Typically, the transmitter and receiver are spaced apart over a distance of 2 to 10 mm. By positioning the transmitter and receiver at such close distance, facilitates the reception of signals even when they are strongly damped such as in water-oil emulsions.

The transmitter, receiver and the measurement volume, which can be considered a local, comparatively small volume, can be construed as forming a measurement chamber. By arranging the transmitter and receiver close to each other, the transducers only sense the flow inside the measurement chamber.

In an embodiment, the transmitter and receiver have a streamlined profile such as a wing shaped form, to mitigate flow disturbances. Further, the transmitter and receiver can be connected to the pipeline via connecting rods or plates that may equally be shaped to avoid disturbances.

The device further comprises a process unit that is arranged to determine the frequency of the dispersed ultrasound signal and to determine the velocity of the flow based on Doppler principle. Such a processing unit can e.g. comprise a microprocessor including a DSP (digital signal processor) or the like.

The dispersed ultrasound signal will be generated in a volume around an intersection of the first direction and the second direction. Since this volume is relatively small compared to any spatial disturbances in the fluid, for example in an unsteady flow, the flow velocity in the volume is approximately uniform or constant (that is: constant in space, not necessarily in time). Therefore, the device according to the invention is capable of determining the flow velocity with a high accuracy, since the spatial disturbances will have little or no influence on the determination of the flow velocity.

According to an embodiment of the invention, the first direction and the second direction intersect with each other, defining an intersection angle, the intersection angle being at least 10 degrees, or preferably at least 20 degrees, more preferably in the range of 10-45 degrees, or preferably at least 60 degrees, or more preferable in the range of 80-90 degrees.

The determination of the flow velocity will be more accurate when the received dispersed ultrasound signal is generated in a small volume than in a larger volume. An advantage of a configuration of the transmitter and the receiver, in which the intersection angle between the first and the second direction is at least 10 degrees is that the volume wherein the dispersed ultrasound signal is generated is smaller than in a configuration with an intersection angle less than 10 degrees.

According to an embodiment of the device according to the invention, the flow velocity defines a flow direction, the first direction and the flow direction define an incident angle, the second and the flow direction define a dispersion angle, and wherein the incident angle is equal to the dispersion angle.

An advantage of this configuration is that the velocity difference between the transmitter and the fluid will be equal to the velocity difference between the fluid and the receiver. This enables a more easy calculation or determination of the flow velocity.

In an embodiment of the device according to the invention, the first direction, the second direction and the flow direction are coplanar.

According the invention, both the transmitter and the receiver are arranged to be placed inside the pipeline. Inside the pipeline, they may more or less cause disturbances in the flow. An advantage of the configuration in one plane, is that the transmitter and the receiver cause less turbulence or disturbances when they are placed symmetric about the flow direction.

In an embodiment, the device according to the invention is applied in a measurement arrangement comprising a first pipeline segment connected to a second pipeline segment, whereby the device according to the invention is arranged inside the second segment. During use, the first pipeline segment is mounted in a substantially horizontal direction and the second pipeline segment extends in a substantially vertical direction, the first pipeline segment being arranged to receive the fluid or fluid component and provide the fluid or fluid component to the second pipeline segment.

In such arrangement, the transmitter and receiver and the measurement volume are thus, in use, arranged inside a vertical pipeline segment. The use of a horizontal pipeline section, also referred to as a pipe pre-section enables to form gas slugs in case of a gas-liquid flow is applied.

The use of the horizontal pre-section helps to separate gas and liquid phases (if present) in the fluid flow along the pipe and provides for an alternate arrival of the liquid and gas into the measurement chamber. The horizontal pre-section can be used to stabilize the flow and provide in a partial coalescence of the gas phase (if present). When connected to a vertical pipe segment comprising the device according to the invention, a slug flow pattern of a multiphase flow can be obtained in a wide range of gas and liquid flow rates.

In an embodiment of the device according to the invention, the fluid comprises a first fluid component and a second fluid component. The first and the second fluid component may be a liquid or a gas. The fluid may therefore be a combination of a liquid and gas, but also combinations of two different liquids or two different gasses are possible. It may be the case that the velocity of the first component is different from the velocity of the second component.

In an embodiment of the device according to the invention, the processing unit is further arranged to determine a fraction describing the ratio of a volume of the first fluid component of the fluid and a volume of the second fluid component of the fluid.

An advantage of this embodiment is that it enables the determination of the flow rate of one of the components of the fluid, since the flow rate of a component in a fluid is dependent on the volume of the component in the fluid and the flow velocity of this component. In an embodiment, the processing unit is further arranged to determine a flow rate of the first fluid component based on the flow velocity of the first fluid component and said fraction.

According to an embodiment of the device according to the invention, the arrangement of the transmitter and the receiver define a measuring volume arranged to contain the fluid or the fluid component; the transmitter is arranged to transmit the ultrasound signal into said measuring volume in the first direction; and, the receiver is arranged to receive the dispersed ultrasound signal from said measuring volume in the second direction.

Since the transmitter is arranged to transmit the ultrasound signal in the first direction and the path of the transmitted ultrasound signal is limited by absorption and dispersion, the transmitter defines a transmitting volume in which the ultrasound signal is transmitted. Likewise, since the receiver is arranged to receive the dispersed ultrasound signal in the second direction and the path of the dispersed ultrasound signal is limited by absorption and dispersion, the receiver defines a receiving volume from which a dispersed ultrasound signal is received. The overlap of the transmitting volume and the receiving volume is referred to as measuring volume, since it is the fluid in the measuring volume that, after having received the transmitted ultrasound signal, generates the dispersed ultrasound signal that is received by the receiver.

In an embodiment of the device according to the invention, the device further comprises a measuring chamber, the measuring chamber comprising a measuring volume arranged to contain the fluid or the fluid component; wherein the transmitter is arranged to transmit the ultrasound signal into said measuring volume in the first direction and the receiver is arranged to receive the dispersed ultrasound signal from said measuring volume in the second direction.

An advantage of this embodiment is that the measuring volume is physically limited by a measuring chamber. In that way, the size, dimensions and/or location of the measuring volume may be controlled. The size, dimensions and/or location of the measuring chamber may be adjustable or may be determined before use.

In another embodiment of the device according to the invention, the measuring volume is smaller than or equal to an average volume of fluid slugs. The first or the second fluid component may comprise fluid slugs, that is a comparatively large continuous volume of said fluid component, for example bubbles of gas.

An advantage of this feature, is that the receiver signal can be used to determine a fraction of a volume of the first fluid component in the fluid with respect to a volume of fluid in a straight forward manner, as will be explained below. Another advantage of this feature is that the flow velocity of a fluid component may be determined, as is also further explained below.

In an embodiment of the device according to the invention, the process unit further comprises a discriminator arranged for splitting the receiver signal in a low-level signal and a high-level signal based on a predetermined threshold level.

An advantage of this feature is that the threshold level may be chosen as to filter out noise in the receiver signal and to form a high-level signal without said noise. Another advantage of the this feature that the threshold level may be chosen as to filter out the dispersed ultrasound signal that is generated by dispersion in the second fluid component, while the flow velocity of the first fluid component is to be determined. The frequency difference may then be determined on the basis of the high-level signal. In an embodiment of the device according to the invention, the processing unit is arranged to determine said frequency difference based on said high-level signal.

In another embodiment of the device according to the invention, the processing unit is arranged to determine said fraction based on said high-level signal. When the threshold level is chosen as to filter out the dispersed ultrasound signal that is generated by dispersion in the second fluid component, the high-level signal will comprise time intervals in which the high-level signal is substantially zero and time intervals in which the high-level signal is non-zero. The first time intervals are the result of the flow of the second fluid component (the receiver signal being filtered out in these time intervals) and the latter time intervals are the result of the flow of first fluid component. The ratio of the sum of the time intervals corresponding to a fluid component with respect to a sample time interval, is said to be equal to the fraction of the volume of the fluid component of the fluid with respect to the total volume of the fluid, as is further explained below.

In another embodiment of the device according to the invention, the processing unit comprises a demodulator arranged for demodulating the receiver signal. A demodulator is arranged to convert a AC signal to a DC signal. An advantage of this feature is that a discriminator for a DC signal is more easy to produce or integrate in an integrated circuit, than a discriminator for a AC signal.

In another embodiment of the device according to the invention, the device further comprises a frequency generator arranged to provide a frequency signal with a predefined constant frequency to the transmitter and the processing unit, wherein the transmitter is arranged to transmit the ultrasound signal based on said frequency signal and the processing unit is arranged to determine the frequency difference based on said frequency signal.

An advantage of the frequency generator is that it provides the same constant frequency to both the transmitter and the processing unit. This enables a determination of the frequency difference with a high accuracy.

In another embodiment of the device according to the invention, the transmitter and/or the receiver have a streamline shape, preferably an aerofoil shape. An advantage of the streamline shape is that it minimizes the turbulence or disturbance of the fluid flow that may be caused by the transmitter and/or the receiver.

In an embodiment, the first direction is at least partly a downstream direction and/or the second direction is at least partly an upstream direction. An advantage of this feature is that it causes more ultrasound signal to be dispersed in the second direction. Another advantage is that a so-called Doppler-shift in frequency caused by the velocity difference between the transmitter and the fluid adds to the Doppler shift caused by velocity difference between the fluid and the receiver. A higher frequency difference will yield a more accurate determination of the flow velocity.

The objective of the present invention is also achieved by a method comprising the steps of a) placing a transmitter and a receiver in a pipeline; b) transmitting an ultrasound signal into the fluid or fluid component in a first direction; c) generating a dispersed ultrasound signal in a second direction, by dispersion of the ultrasound signal by the fluid or the fluid component; d) receiving a dispersed ultrasound signal and providing a receiver signal representing the dispersed ultrasound signal; e) determining a frequency difference between the transmitted ultrasound signal and the dispersed ultrasound signal; and f) determining the flow velocity of the fluid or the fluid component based on said difference.

In an embodiment of the method according to the invention, the first direction and the second direction intersect with each other, defining an intersection angle, the intersection angle being preferably at least 10 degrees, or more preferably at least 20 degrees, or more preferably in the range of 10-45 degrees, or more preferably at least 60 degrees, or more preferably in the range of 80-90 degrees.

In an embodiment of the method according to the invention, the flow velocity defines a flow direction, the first direction and the flow direction define an incident angle, the second and the flow direction define a dispersion angle, and wherein the incident angle is equal to the dispersion angle.

In another embodiment of the method according to the invention, the intersection angle equals a sum of the incident angle and the dispersion angle. An in another embodiment, the first direction, the second direction and the flow direction are coplanar.

In an embodiment of the method according to the invention, the fluid comprises a first fluid component and a second fluid component.

In an embodiment of the method according to the invention, the method further comprises the step of: g) determining a fraction of a volume of the first fluid component with respect to a volume of the fluid.

In a further embodiment, the method comprises the step of: h) determining a flow rate of the first fluid component based on the flow velocity of the first fluid component and said fraction.

In an embodiment, a measuring volume is defined by the transmitter and the receiver through which the fluid or the fluid component is flowing; step b) comprises transmitting the ultrasound signal into said measuring volume in the first direction; and, step d) comprises receiving the dispersed ultrasound signal from said measuring volume in the second direction.

In an embodiment of the method according to the invention, the second fluid component comprises fluid slugs. In another embodiment, the measuring volume is smaller than or equal to an average volume of the said fluid slugs.

In an embodiment, the method further comprises the step of d2) demodulating the receiver signal. In an embodiment, the method further comprises the step of d3) splitting the receiver signal in a low-level signal and a high-level signal based on a predetermined threshold level.

In an embodiment, step g) comprises determining said fraction based on said high-level signal. In another embodiment, step e) comprises determining said frequency difference based on said high-level signal.

In an embodiment, the method further comprises the step of a2) providing a frequency signal with a predefined constant frequency, wherein step b) comprises transmitting the ultrasound signal based on said frequency signal; and, step e) comprises determining the frequency difference based on said frequency signal.

In an embodiment, the first direction is at least partly a downstream direction and the second direction is at least partly an upstream direction.

DESCRIPTION

According to the invention, a device is provided for determining a flow velocity of a fluid or a fluid component in a pipeline. The fluid or fluid component may be a liquid, such as oil, water, or any other liquid or mixtures thereof. The fluid or fluid component may also be a gas, such as air, methane, $CO_2$ or any other hydrocarbon gases or mixtures thereof. The flow velocity of the liquid to be determined may be the flow velocity in the direction of the pipeline. The flow velocity is defined with respect to the pipeline or with respect to the transmitter and/or receiver, since both may be immovably attached to the pipeline.

Figure 1:
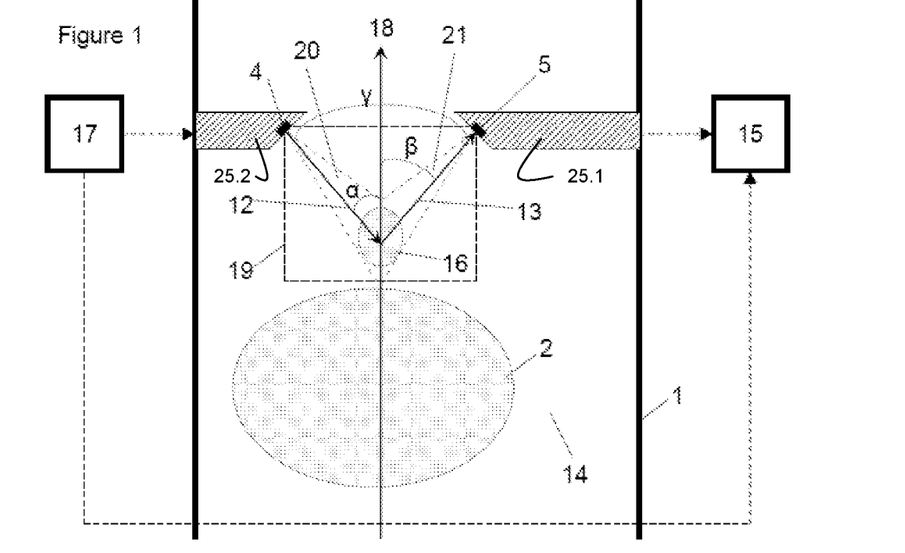
FIG. 1 schematically depicts an embodiment of a device according to the invention.

FIG. 1 shows an embodiment of a device according to the invention. A transmitter 4 is located in a pipeline 1. In the pipeline a fluid 14 or a fluid component 2 in the fluid 14 may be flowing in the flow direction 18. The transmitter 4 is arranged to transmit an ultrasound signal into the fluid or fluid component in a first direction 12. The ultrasound signal is dispersed by the fluid or the fluid component in a second direction 13. This dispersed ultrasound signal is received by receiver 5.

The first direction and the second direction may intersect with each other, defining an intersection angle γ, as can been seen in FIG. 1. The intersection angle may be at least 10 degrees, or at least 20 degrees, or more preferably at least 60 degrees. A measuring volume is indicated by 16 as the volume wherein the dispersed ultrasound signal is generated that is further received by the receiver.

A transmitting volume 20 may be defined by the path or penetration depth of the transmitted ultrasound signal in the fluid and the first direction, while a dispersion volume 21 may be defined by the path or penetration depth of the received dispersed ultrasound signal in the fluid and the second direction. The overlap of transmitting volume 20 and dispersion volume 21 comprises the measuring volume 16. Therefore, the measuring volume 16 may be defined by the path or penetration depth of the transmitted ultrasound signal in the fluid, the first direction, the path or penetration depth of the received dispersed ultrasound signal in the fluid and the second direction. The path of an ultrasound signal in the fluid may be limited by absorption and dispersion of the signal in the fluid and may be in the range of several millimeters.

Therefore, the measuring volume may in the range of several cubic millimeters.

However, the measuring volume is also dependent on the intersection angle. A small intersection angle (for example smaller than 5 degrees) will yield a large volume, while a large intersection angle (for example around 90 degrees) will yield a small volume. However, an advantage of a larger measuring volume is that it will yield a larger dispersed ultrasound signal. A advantage of a small measuring volume is that the flow velocity may be determined more accurately since the effect of any spatial disturbances in the fluid is also small in a small measuring volume.

Because of these effects, an preferable intersection angle has been found to be at least 10 degrees, or more preferably at least 20 degrees, or even more preferably around 10-45 degrees or more preferably at least 60 degrees, or even more preferably around 80-90 degrees.

In order to arrange for the measuring volume to be comparatively small, i.e. having a cross-section that is comparatively small to the cross-section of the pipe, the transmitter and receiver are arranged on connecting or mounting members 25.1 and 25.2 inside the pipeline. The members may e.g. have a streamline shape to avoid disturbances. By doing so, the transmitter and receiver can be spaced apart over a comparatively small distance, compared to the pipeline diameter. By doing so, the measurement volume 16 can be arranged to be smaller that the volume of a typical slug 2 of the fluid, see also further on.

Figure 2:
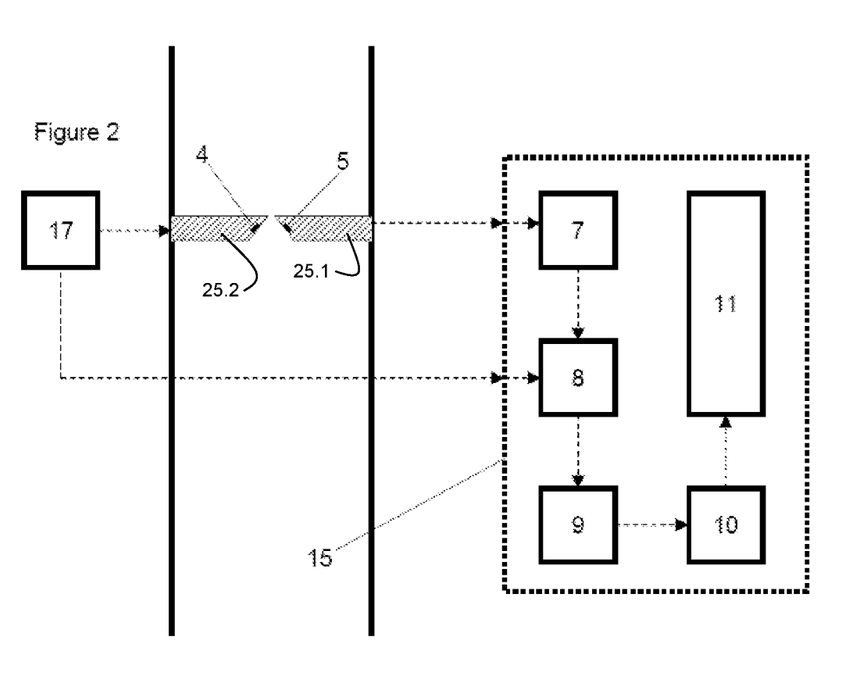
FIG. 2 schematically depicts an embodiment of a device according to the invention.

In an embodiment, the transmitter and receiver are mounted with their active (transmitting and receiving, respectively) surfaces directed towards each other (i.e. intersecting as described above) at a comparatively small distance apart compared to the pipeline diameter. In an embodiment, the mounting member such as mounting members 25.1 and 25.2 as shown in FIGS. 1 and 2 are arranged to mount the transmitter and receiver such that a transmitter-receiver distance in a direction perpendicular to the flow direction is less than 50% of the pipe diameter, preferably less than 10%. Typically, the transmitter and receiver are mounted with their active (transmitting and receiving, respectively) surfaces directed against each other at a distance of 2 to 10 mm in a pipe diameter plane. The flow measured can thus pass unimpeded through the measurement volume parallel to the pipe axis. A typical size of such transmitter and receiver is 5 to 8 mm. A minimal diameter of the pipe containing the measurement chamber (formed by the transmitter 4, receiver 5 and measurement volume 16) is typically 40 mm. In most cases the pipe diameter is between 60 and 150 mm. Thus, in the general case the transmitter to receiver distance equals to 5 to 10% of the diameter of a pipe.

In FIG. 1, the distance between the transmitter 4 and the receiver 5 has been enlarged as to clearly depict the first, second and flow direction and the incident and dispersion angle. In practice, the transmitter 4 and receiver 5 are positioned comparatively close together, due to the absorption of the signal in the fluid.

Based on the received ultrasound signal, the receiver 5 provides a receiver signal that is representing the dispersed ultrasound signal. The receiver signal may comprise information about the frequency of the dispersed ultrasound signal that is received by the receiver and information about the amplitude of the dispersed ultrasound signal that is received by the receiver. The receiver signal may be an electrical signal, of which the frequency and the amplitudes correspond to those of the dispersed ultrasound signal.

The transmitter may e.g. be a piezo-electric transmitter and the receiver may e.g. be piezo-electric receiver.

The device further comprises a processing unit 15 that uses the receiver signal to determine the flow velocity of the fluid or the fluid component based on the well known Doppler effect. When the fluid is flowing, the frequency of the received ultrasound signal is different from the frequency of the transmitted ultrasound signal. The frequency difference is dependent on the component of the flow velocity in the first direction and the component of flow velocity in the second direction and the frequency of the transmitted ultrasound signal.

An incident angle α may defined as the angle between the first direction 12 and the direction of the flow velocity, referred to the flow direction 18. A dispersion angle β may be defined as the angle between the second direction 13 and the flow direction 18. The flow direction and the first and second direction may be known from the configuration of the transmitter and the receiver in the pipeline. As can be seen from FIG. 1, the first direction is at least partly a downstream direction whereas the second direction is at least partly an upstream direction.

When the incident angle α is equal to the dispersion angle β, the flow velocity may be determined on the basis of the formula:

$$w = 2 \cdot c \cdot \cos(\beta) \cdot (f_d - f_t)/f_t,$$

where:
w: flow velocity
c: velocity of the ultrasound signal in the fluid
β: incident/dispersion angle
$f_d$ frequency of the dispersed ultrasound signal
$f_t$ frequency of the transmitted ultrasound signal The processing unit 15 may be arranged to determine the flow velocity on the basis of this formula.

In an embodiment of the invention, the device further comprises a frequency generator 17 arranged to provide a frequency signal with a predefined constant frequency to the transmitter and the processing unit. This frequency signal may be used by the transmitter for transmitting an ultrasound signal with a certain frequency. Since the processing unit 15 determines the flow velocity on the basis of the frequency of the transmitted ultrasound signal, it is advantageous to provide the same frequency signal to the processing unit 15.

The function of the frequency generator may be also provided in the transmitter, in the processing unit or as a separate unit.

In accordance with the invention, the device may used for determining a flow velocity of a fluid component in a pipeline. A fluid in the pipeline may comprise two fluid components, such as a liquid, for example oil, and a gas, for example methane or other hydrocarbon gases, air, nitrogen, etc. It may be required to determine the flow velocity of the liquid and/or the gas separately, since the flow velocity of the components may be different. For example, the flow velocity of the methane may be higher than the flow velocity of the oil.

However, an ultrasound signal transmitted into a fluid comprising two fluid components, may be dispersed by two fluid components at the same time. The dispersed ultrasound signal may then be a combination of the ultrasound signal dispersed by the first fluid component and the ultrasound signal dispersed by the second fluid component. The determination of a flow velocity of one of fluid components based on the receiver signal may then be difficult.

It may be the case that the first fluid component and/or the second fluid component are formed in the shape of slugs. This means that the first fluid component is not dissolved in the second fluid component (nor vice versa). Instead, separate volumes of one (or more) of the fluid components may be identified in the fluid. Such separate volumes of one fluid component are referred to as slugs. For example, a fluid may comprise oil slugs and gas slugs. In FIG. 1 such a slug is schematically indicated by 2.

According to an embodiment of the invention, the measuring volume 16 is smaller than or equal to an average volume of the said fluid slugs. In that case, the measuring volume 16 is, in general, completely filled with one of the fluid components at a certain moment. In that case, the dispersed ultrasound signal is only generated by one of the fluid components and a flow velocity of that fluid component may be determined as is described above. For example, it can be seen in FIG. 1 that the slug 2 will fill the measuring volume 16 when the fluid is flowing through the measuring volume 16. By doing so, the different components of the fluid can be observed by the receiver in an alternate manner. Phrased differently, by arranging the transmitter and receiver comparatively close together and thus observing a comparatively small measurement volume (compared to arrangements where the transmitter and receiver are arranged on or in the pipeline surface (either inner or outer)) enables the receiver to receive signals that substantially determined by reflections on a single component of the fluid. As a result, a more clear distinction can be made when a particular component passes the measurement volume and thus, a more clear assessment of the different volume fractions (see also further on) can be made, enabling a more accurate assessment of the flow rate through the pipeline.

Further measures to provide in an improved separation of the fluid components when passing through the measurement volume include the use of a horizontal pre-section, as explained in more detail below in FIGS. 4a and 4b.

As is illustrated in FIG. 1 and described above, the measuring volume 16 may be defined by the transmitter and the receiver, the transmitter transmitting the ultrasound signal into the measuring volume in the first direction; and the receiver receiving the dispersed ultrasound signal from said measuring volume in the second direction. The measuring volume may thus be dependent on the location and/or the configuration of the transmitter and the receiver. The measuring volume may therefore be controlled by adjusting the configuration and/or location of the transmitter and the receiver.

To further control the measuring volume, the device may further comprise a measuring chamber 19 comprising the measuring volume 16. In that case, by adjusting the dimensions and location of the measuring chamber, the measuring volume may be adjusted. For example, the measuring volume may further decreased by decreasing the dimensions of the measuring chamber, without adjusting the configuration of the transmitter and the receiver.

In an embodiment of the invention, the measuring chamber comprises several fluid inlets and fluid outlets, arranged for letting the fluid flow through the measuring chamber.

In all of the above-described embodiments, the receiver signal may comprise some noise. The amplitude of the noise in the receiver signal is usually relatively small. It may therefore be advantageous to split the receiver signal in a low-level signal (comprising the noise) and a high-level based on a predetermined threshold level. This may comprise filtering the noise or the low-level signal out of the received signal in order to obtain the high-level signal. The low-level signal itself need not be generated or outputted. The predetermined threshold may be chosen as to correspond to the (expected) noise level.

In the case of a fluid with two or more fluid components, it may be case that the receiver signal comprises time intervals in which the signal is caused by a first fluid component and time intervals in which the signal is caused by the second or another fluid component. This may especially be the case when the measuring volume is smaller than or equal to an average volume of the slugs of the fluid components. Because of the different characteristics of the fluid components, the amplitude of the receiver signal may be different in these different time intervals.

For example, in the case of a fluid comprising oil and a gas as the two fluid components, it may be the case that the gas does not or only in limited manner generate a dispersed ultrasound signal. This would cause the amplitude in the receiver signal in the time intervals when the gas is occupying the measuring volume to be small in comparison with the amplitude in the time intervals when the oil is occupying the measuring volume.

It may therefore be advantageous to split the receiver signal in a low-level signal and a high-level based on a predetermined threshold level, where the predetermined threshold may be chosen such that the high-level signal comprises the time intervals corresponding to a first fluid component and the low-level signal comprises the time intervals corresponding to a second fluid component. In this way, the flow velocity of two fluid components may be determined separately, using the low-level signal and the high-level signal. Also in this case, noise may be filter out of the low-level signal and/or the high-level signal.

It may be understood that the receiver signal may also be split up in more than two signals. For example, the receiver signal may be split up in three signals (for example a low-level signal, a middle-level signal and a high-level signal), when the fluid comprises three fluid components, each having a distinguishable signal time interval.

FIG. 2 illustrates schematically some signal processing steps in the processing unit 15. The receiver signal from the receiver 5 may be amplified by amplifier 7 and then mixed by a mixer 8 with the frequency signal. The mixer generates a differential signal, indicating the frequency difference between the receiver signal and the frequency signal, that is the frequency difference between the transmitted ultrasound signal and the received dispersed ultrasound signal. The splitting and/or filtering of this signal may be performed in a discriminator 10. The discriminator may be a low-pass filter. To facilitate the function of the discriminator 10, the processing unit 15 may comprise a demodulator arranged for demodulating the receiver signal. The demodulator is arranged to convert an AC signal to a DC signal. The demodulator may be integrated in the receiver 5, the amplifier 7 or the mixer 8. After the splitting or filtering of the signal, the high-level signal (or the low-level signal or the middle-level signal) may enter a analog-to-digital convertor (ADC) 10. The digital signal of the ADC may then be used by a computation unit 11. The computation unit 11 may be arranged to determine the flow velocity of the fluid or the fluid component.

Since the frequency of the differential signal can be several orders less than the frequency of the receiver signal, the requirements for the ADC specifications are significantly reduced in comparison with an embodiment in which the computation unit is arranged to calculate the frequency difference directly on the basis of a digitized receiver signal. FIG. 2 further schematically depicts, as in FIG. 1, the transmitter 4 and receiver 5 arranged on connecting or mounting members 25.1 and 25.2 inside the pipeline thus enabling the measuring volume to be comparatively small.

Figure 3A:
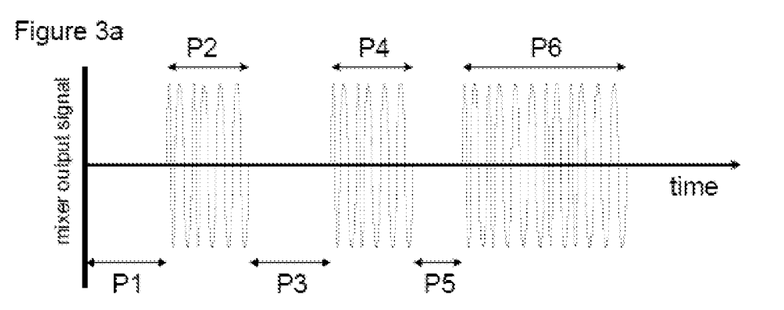
FIG. 3a schematically depicts a mixer output signal.
Figure 3B:
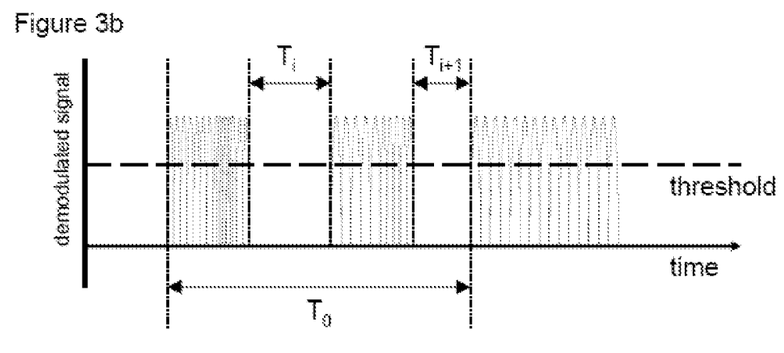
FIG. 3b schematically depicts a demodulated receiver signal.

FIG. 3a shows a schematic overview of a mixer output signal and FIG. 3b of schematic overview of a demodulated signal. The mixer output signal comprises several time intervals P1-P6. In the time intervals P1, P3 and P5 the amplitude of the signal is small in comparison with the signal in the time intervals P2, P4 and P6. It may be case that this signal is caused by a fluid comprising a liquid such as oil and gas slugs.

It is known that gas slugs generate little or no dispersed ultrasound signals and therefore it may be concluded that during the time intervals P1, P3 and P5 the measuring volume was filled with gas slugs, while in the time intervals P2, P4 and P6 the measuring volume was filled with the oil. In FIG. 3b it can be seen how the demodulated signal is a DC-signal. An example of a threshold level is also shown. The splitting or filtering of this signal may then be easily performed by a low-pass filter.

Generally, to determine a flow rate of one of the fluid components in the pipeline, for example the flow rate of oil, not only the cross section area of the pipeline and the flow velocity of that component are required, but also the fraction of volume of that fluid component with respect to the volume of all fluid components together (i.e. the volume of the fluid). The flow rate may be determined on the basis of the formula:

$$Q = \phi \cdot w \cdot S$$

where:
Q: volume flow rate of the fluid component
$\phi$: fraction of the fluid component
w: flow velocity of the fluid component
S: cross section area of the pipeline According to an embodiment of the invention, the processing unit may be arranged to determine the flow rate of a fluid or a fluid component. The processing unit 15 may be arranged to determine the flow rate on the basis of this formula.

The cross section of the pipeline is a constant and known and may be inputted to the processing unit 15. The flow velocity of a fluid component may be determined in accordance with one of the embodiments described above. The fraction of the fluid component may be determined in several ways, for example based on the weight of a sample of the fluid or other characteristic of that sample. However, it may advantageous to determine the fraction of the fluid component in situ and continuously, since the fraction may vary over time.

According to an embodiment of the invention, the fraction may be determined on the basis of the time intervals of that fluid component in the receiver signal. The fraction may be determined on the basis of the formula:

$$\phi = T/T_0$$

where:
$\phi$: fraction of the fluid component
$T_0$: a sample time interval
T: sum of the durations of the time intervals of the fraction.

The sample time interval may be any time interval in which the average fraction is to be determined. It should be at least more than the sum of the durations of the time intervals of the fraction. In FIG. 3b, two of the time intervals of a fluid component, for example gas, have been indicated by Ti and Ti+1. A sample time interval is indicated by $T_0$.

In an embodiment of the invention, the processing unit is arranged to determine the fraction on the basis of the above-mentioned formula. Based on the determined fraction of the fluid component, the determined flow velocity of the fluid component, the inputted cross section area of the pipeline, the processing unit 15 may be further arranged to determine the flow rate of the fluid component in fluid comprising at least 2 fluid components.

Above it is also explained how a flow velocity of a fluid or a fluid component in a pipeline can be determined by a method comprising the steps of: a) placing a transmitter and a receiver in a pipeline; b) transmitting an ultrasound signal into the fluid or fluid component in a first direction; c) generating a dispersed ultrasound signal in a second direction, by dispersion of the ultrasound signal by the fluid or the fluid component; d) receiving a dispersed ultrasound signal and providing a receiver signal representing the dispersed ultrasound signal; e) determining a frequency difference between the transmitted ultrasound signal and the dispersed ultrasound signal; and, f) determining the flow velocity of the fluid or the fluid component based on said difference.

Figure 4A:
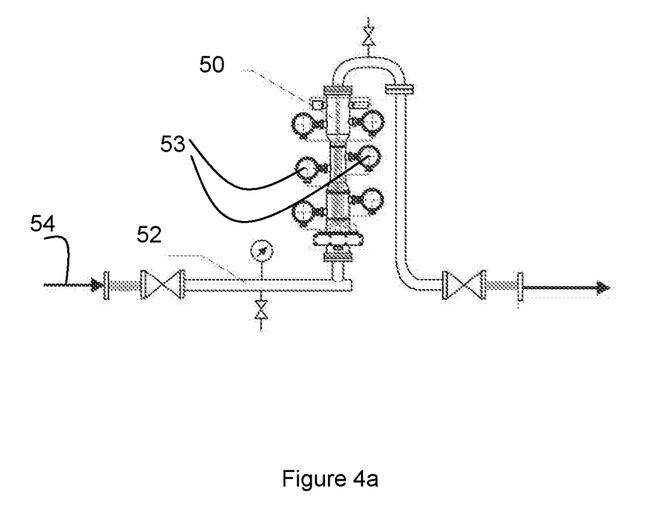
FIGS. 4a and 4b schematically depict a pipe segment including a horizontal pre-section for stabilizing the flow.

In FIG. 4a, an arrangement of a vertical pipe-segment 50 that is preceded by a horizontal section 52, referred to as a horizontal pre-section, is schematically shown. The pre-section 52 of the pipe can be used to stabilize the flow and can provide a partial coalescence of a gas phase of the fluid (if present). A particular type of such pre-section is a horizontal pipe where natural separation of the flow can occur thanks to gravity force. When such a horizontal pipe or pre-section is connected to the input of a vertical pipe 50 that comprises the measurement arrangement (i.e. the transmitter and receiver arranged to observe the flow in a measurement volume as described above), such an arrangement can result in a so-called slug flow pattern of a multiphase flow in the wide range of gas and liquid flow rates. Such a slug flow pattern can provide, in the devices according to the invention, an alternate arrival of gas and liquid fractions in the measurement volume.

FIG. 4a further schematically shows the position of the measurement arrangement 53 in the vertical pipe-segment 50 and the flow direction, indicated by the arrow 54.

Figure 4B:
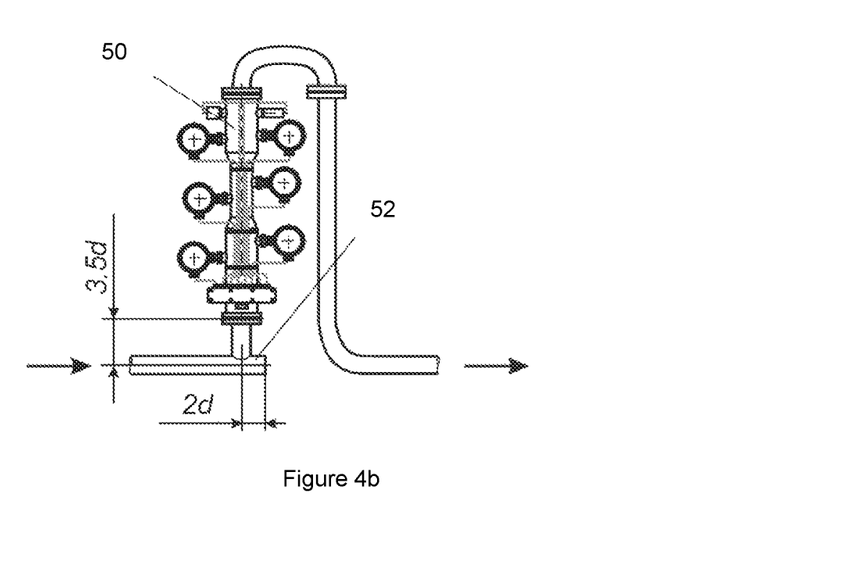

In FIG. 4b, some more details are shown on the horizontal pre-section 52 and the connected pipe 50, showing typical dimensions as a function of the pipe diameter d.

As required, detailed embodiments of the present invention have been disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention. The mere fact that certain measures are recited in mutually different dependent claims does not indicate that a combination of these measures cannot be used to advantage.

A single processor or other unit may fulfill the functions of several items recited in the claims.

The invention claimed is:

1. A device for determining a flow velocity of a fluid or a fluid component in a pipeline, comprising:
   a transmitter adapted to be placed inside the pipeline and arranged to transmit an ultrasound signal into the fluid or fluid component in a first direction;
   a receiver adapted to be placed inside the pipeline and arranged to receive a dispersed ultrasound signal, generated by dispersion of the ultrasound signal by the fluid or the fluid component in a second direction, the second direction being different from the first direction, and to provide a receiver signal representing the dispersed ultrasound signal; and
   a processing unit arranged to receive said receiver signal and to determine a frequency difference between the transmitted ultrasound signal and the dispersed ultrasound signal and determining the flow velocity of the fluid or the fluid component based on said difference;
   wherein the fluid comprises a first fluid component and a second fluid component;
   wherein the transmitter and the receiver define a measuring volume arranged to contain the fluid or the fluid component;
   wherein the transmitter is arranged to transmit the ultrasound signal into said measuring volume in the first direction;
   wherein the receiver is arranged to receive the dispersed ultrasound signal from said measuring volume in the second direction;
   wherein the second fluid component comprises fluid slugs; and
   wherein the measuring volume is smaller than or equal to an average volume of the said fluid slugs.

2. The device according to claim 1, wherein the first direction and the second direction intersect with each other, defining an intersection angle, the intersection angle being at least 10 degrees.

3. The device according to claim 2, wherein the intersection angle is between 80-90 degrees.

4. The device according to claim 1, wherein the flow velocity defines a flow direction, the first direction and the flow direction define an incident angle, the second and the flow direction define a dispersion angle, and wherein the incident angle is equal to the dispersion angle.

5. The device according to claim 4, wherein the intersection angle equals a sum of the incident angle and the dispersion angle.

6. The device according to claim 4, wherein the first direction, the second direction and the flow direction are coplanar.

7. The device according to claim 1, wherein the processing unit is further arranged to determine a fraction of a volume of the first fluid component with respect to a volume of the fluid.

8. The device according to claim 7, wherein the processing unit is further arranged to determine a flow rate of the first fluid component based on the flow velocity of the first fluid component and said fraction.

9. The device according to claim 1 further comprising a measuring chamber, the measuring chamber comprising a measuring volume arranged to contain the fluid or the fluid component;
   wherein the transmitter is arranged to transmit the ultrasound signal into said measuring volume in the first direction and the receiver is arranged to receive the dispersed ultrasound signal from said measuring volume in the second direction.

10. The device according to claim 1, wherein the processing unit further comprises a discriminator arranged for splitting the receiver signal in a low-level signal and a high-level signal based on a predetermined threshold level.

11. The device according to claim 10, wherein the processing unit is arranged to determine said fraction based on said high-level signal.

12. The device according to claim 10, wherein the processing unit is arranged to determine said frequency difference based on said high-level signal.

13. The device according to claim 1, wherein the processing unit further comprises a demodulator arranged for demodulating the receiver signal.

14. The device according to claim 1 further comprising:
   a frequency generator arranged to provide a frequency signal with a predefined constant frequency to the transmitter and the processing unit, wherein the transmitter is arranged to transmit the ultrasound signal based on said frequency signal and the processing unit is arranged to determine the frequency difference based on said frequency signal.

15. The device according to claim 1, wherein the transmitter and/or the receiver have a streamline shape.

16. The device according to claim 1, wherein the first direction is at least partly a downstream direction and the second direction is at least partly an upstream direction.

17. The device according to claim 1 further comprising a mounting member for mounting the transmitter and receiver inside the pipeline.

18. The device according to claim 17, wherein the mounting member is arranged to mount the transmitter and receiver spaced apart over a distance smaller than 50% of a pipeline diameter.

19. The device according to claim 17, wherein the mounting member has a streamlined shape.

20. Measurement arrangement comprising a first pipeline segment connected to a second pipeline segment and comprising a device according to any preceding claim, whereby, in use, the first pipeline segment extends in a substantially horizontal direction and the second pipeline segment extends in a substantially vertical direction, the first pipeline segment being arranged to receive the fluid or fluid component and provide the fluid or fluid component to the second pipeline segment.

21. The device according to claim 1, wherein the transmitter and/or the receiver have an aerofoil shape.

22. The device according to claim 17, wherein the mounting member is arranged to mount the transmitter and receiver spaced apart over a distance smaller than 10% of a pipeline diameter.

23. The device according to claim 17, wherein the mounting member has an aerofoil shape.

24. Method for determining a flow velocity of a fluid or a fluid component in a pipeline, comprising:
  placing a transmitter and a receiver in a pipeline;
  transmitting an ultrasound signal into the fluid or fluid component in a first direction;
  generating a dispersed ultrasound signal in a second direction, by dispersion of the ultrasound signal by the fluid or the fluid component;
  receiving a dispersed ultrasound signal and providing a receiver signal representing the dispersed ultrasound signal;
  determining a frequency difference between the transmitted ultrasound signal and the dispersed ultrasound signal; and
  determining the flow velocity of the fluid or the fluid component based on said difference;
  wherein the fluid comprises a first fluid component and a second fluid component;
  wherein a measuring volume is defined by the transmitter and the receiver through which the fluid or the fluid component is flowing;
  wherein transmitting an ultrasound signal into the fluid or fluid component in a first direction comprises transmitting the ultrasound signal into said measuring volume in the first direction;
  wherein receiving a dispersed ultrasound signal and providing a receiver signal representing the dispersed ultrasound signal comprises receiving the dispersed ultrasound signal from said measuring volume in the second direction;
  wherein the second fluid component comprises fluid slugs; and
  wherein the measuring volume is smaller than or equal to an average volume of the said fluid slugs.

25. Method according to claim 24, wherein the first direction and the second direction intersect with each other, defining an intersection angle, the intersection angle being at least 10 degrees.

26. Method according to claim 25, wherein the intersection angle is between 80-90 degrees.

27. Method according to claim 24, wherein the flow velocity defines a flow direction, the first direction and the flow direction define an incident angle, the second and the flow direction define a dispersion angle, and wherein the incident angle is equal to the dispersion angle.

28. Method according to claim 27, wherein the intersection angle equals a sum of the incident angle and the dispersion angle.

29. Method according to claim 27, wherein the first direction, the second direction and the flow direction are coplanar.

30. Method according to claim 24 further comprising:
  determining a fraction of a volume of the first fluid component with respect to a volume of the fluid.

31. Method according to claim 30 further comprising:
  determining a flow rate of the first fluid component based on the flow velocity of the first fluid component and said fraction.

32. Method according to claim 24 further comprising:
  demodulating the receiver signal.

33. Method according to claim 24 further comprising:
  splitting the receiver signal in a low-level signal and a high-level signal based on a predetermined threshold level.

34. Method according to claim 33, wherein determining a fraction of a volume of the first fluid component with respect to a volume of the fluid comprises determining said fraction based on said high-level signal.

35. Method according to claim 33, wherein determining a frequency difference between the transmitted ultrasound signal and the dispersed ultrasound signal comprises determining said frequency difference based on said high-level signal.

36. Method according to claim 24 further comprising:
  providing a frequency signal with a predefined constant frequency,
  wherein transmitting an ultrasound signal into the fluid or fluid component in a first direction comprises transmitting the ultrasound signal based on said frequency signal; and,
  wherein determining a frequency difference between the transmitted ultrasound signal and the dispersed ultrasound signal comprises determining the frequency difference based on said frequency signal.

37. Method according to claim 24, wherein the first direction is at least partly a downstream direction and the second direction is at least partly an upstream direction.

38. Method according to claim 24, wherein placing a transmitter and a receiver in a pipeline comprises mounting the transmitter and receiver spaced apart over a distance smaller than 50% of a pipeline diameter.

39. Method according to claim 24, wherein the transmitter and receiver are mounted in a vertical segment of the pipeline that is preceded by a horizontal segment of the pipeline.

40. Method according to claim 24, wherein placing a transmitter and a receiver in a pipeline comprises mounting the transmitter and receiver spaced apart over a distance smaller than 10% of a pipeline diameter.

* * * * *